United States Patent [19]
Wigmore

[11] Patent Number: 6,016,838
[45] Date of Patent: Jan. 25, 2000

[54] VALVE CONSTRUCTION

[75] Inventor: Richard Wigmore, Brighton, United Kingdom

[73] Assignee: Mead Fluid Dynamics, Inc., Chicago, Ill.

[21] Appl. No.: 08/813,696

[22] Filed: Mar. 7, 1997

[51] Int. Cl.[7] .......................... F16K 11/07; F16K 31/143
[52] U.S. Cl. .............................. 137/625.64; 137/625.66; 137/625.68; 137/884; 251/14; 251/63.5; 251/367; 285/323
[58] Field of Search ........................ 137/596.15, 596.16, 137/625.64, 625.66, 625.68, 884; 251/14, 367, 63.5, 63.6; 285/322, 323, 373

[56] References Cited

U.S. PATENT DOCUMENTS

| | | | |
|---|---|---|---|
| 3,092,141 | 6/1963 | Stark | 251/367 |
| 3,385,561 | 5/1968 | Whalen | 251/14 |
| 3,530,897 | 9/1970 | Buchanan | 137/625.66 |
| 4,456,026 | 6/1984 | Kantor | 251/367 |
| 4,646,785 | 3/1987 | Ruedle et al. | 137/625.66 |
| 4,840,198 | 6/1989 | Ott | 137/625.64 |
| 5,038,670 | 8/1991 | Roe | 137/596.16 |
| 5,172,727 | 12/1992 | Stoll et al. | 137/625.66 |
| 5,222,715 | 6/1993 | Framberg | 137/596.16 |
| 5,361,803 | 11/1994 | Stoll | 137/625.66 |
| 5,459,953 | 10/1995 | Fukano et al. | 137/596.16 |
| 5,487,409 | 1/1996 | Stoll et al. | 137/625.66 |
| 5,586,570 | 12/1996 | Fukano et al. | 137/596.16 |
| 5,606,993 | 3/1997 | Stoll | 137/625.66 |
| 5,623,968 | 4/1997 | Thorp | 137/625.64 |

FOREIGN PATENT DOCUMENTS

| | | | |
|---|---|---|---|
| 0116739 | 8/1984 | European Pat. Off. | 137/625.64 |
| 2248910 | 4/1992 | United Kingdom | 137/625.64 |

*Primary Examiner*—George L. Walton
*Attorney, Agent, or Firm*—Andrus, Sceales, Starke & Sawall

[57] ABSTRACT

An improved valve construction having increased flow/pressure characteristics. The valve comprises a molded valve body including a plurality of body sections each having a generally flat inner surface, and the inner surfaces are disposed in contiguous relation along an interface. Each inner surface is formed with a plurality of recesses that mate with and complement recesses in the inner surface of the other body section to form a valve chamber and a connecting piston chamber. A spool valve is mounted for sliding movement in the valve chamber, while a piston having a generally oval cross-section is connected to the spool and is mounted for movement in the oval-shaped piston chamber. The inner surfaces of the body sections are also formed with a plurality of channel portions which mate and complement channel portions in the other body section to form flow channels that communicate with the valve chamber and the piston chamber. By supplying fluid to the piston chamber, the piston will be moved to actuate the valve to control the flow of fluid to an external operating member, such as a fluid cylinder. The valve member, piston and other moving components are sealed to the respective chambers by annular seal assemblies that consist of a rigid back-up ring and a resilient ring that is mechanically locked and bonded to the back-up ring.

8 Claims, 3 Drawing Sheets

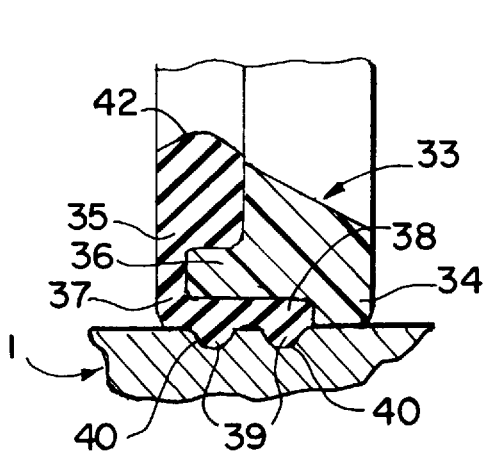
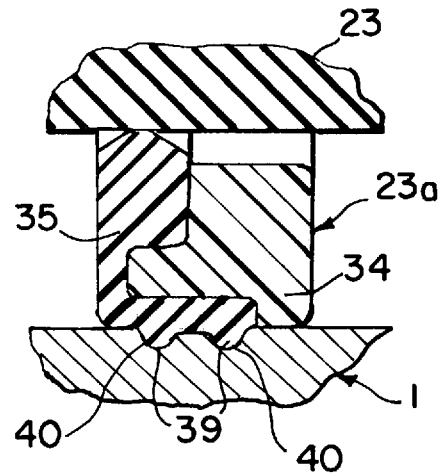
FIG. 5A  FIG. 5B
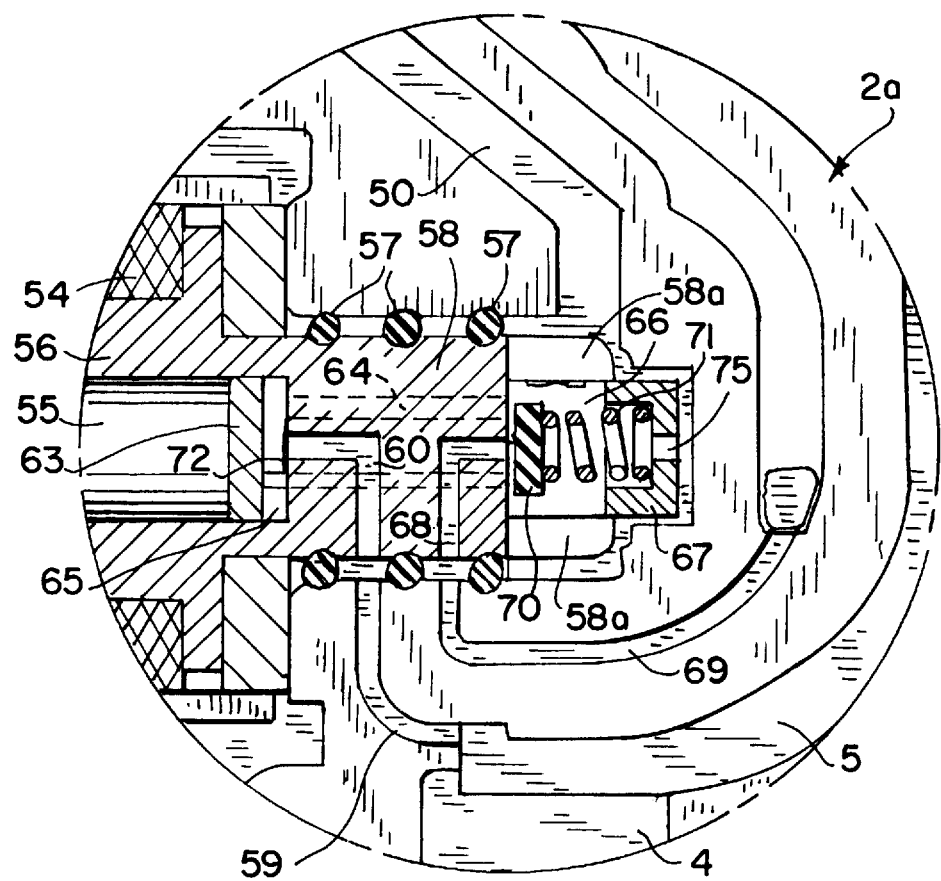
FIG. 6

VALVE CONSTRUCTION

BACKGROUND OF THE INVENTION

U.S. Pat. No. 5,222,715 describes a valve construction having improved power density, compactness, and cost effectiveness. The valve construction of that patent includes a valve body formed of two or more sections which are joined at interfaces that lie in planes parallel to the direction of operation of the operating components of the valve. More specifically, each body section has a generally flat inner surface that is disposed in flatwise contiguous relation to the inner surface of a second body section along an interface. Each inner surface is provided with a plurality of recesses that mate with and complement recesses in the inner surface of the other body section to form compartments or chambers that receive operating components, such as a valve, solenoid, and the like. Each operating component includes a movable element that is movable in a direction parallel to the plane of the interface.

As described in the aforementioned patent, the inner surface of each body section is also formed with a plurality of channel portions that mate with and complement channel portions in the inner surface of the other body section to form flow channels that interconnect the compartments. Similarly, the inner surface of each body section is formed with a plurality of port sections which mate with port sections in the inner surface of the other body section to form ports that establish communication between the flow channels and the exterior of the valve body.

To assemble the valve of the aforementioned patent, the internal components are dropped into the recesses of one of the body sections and the second body section is then placed over the first section with the components or internal; parts seating within the recesses in the second body section. The two body sections are then joined together along the interface to provide the completed valve body.

With the valve construction of U.S. Pat. No. 5,222,715, all of the internal components are automatically trapped in place and all channels and ports are formed and sealed. Thus, there is no need for additional machining, nor is there a need for port inserts, retaining caps, or assembly screws, as is necessary in conventional valve constructions.

SUMMARY OF THE INVENTION

The invention is directed to a valve construction that is an improvement to that shown in U.S. Pat. No. 5,222,715. In accordance with the invention, the valve body includes a plurality of body sections, preferably composed of plastic material, each having an inner surface and the inner surfaces are disposed in contiguous relation along an interface. The inner surface of each body section is formed with a plurality of recesses that mate with and complement recesses in the inner surface of the other body section to form a valve chamber or compartment and a connected piston chamber or compartment. A valve member is mounted for sliding movement within the valve chamber and is operably connected to a piston that is similarly mounted for movement within the piston chamber. As a feature of the invention, the piston, as well as the piston chamber, are formed with a non-circular, preferably oval, cross section having a minor diameter and a larger major diameter which is parallel to the interface between the body sections of the valve body. The oval shape of the piston increases the piston cross-sectional area for a given thickness of valve body, thus allowing lower pilot pressures to actuate the valve. The half-shell construction of the valve of the invention enables the piston, as well as the piston chamber, to be constructed with the oval crosssection.

The inner surface of each body section is also formed with a plurality of channels portions which mate with and complement channel portions in the inner surface of the other body section to form flow channels that communicate with the valve chamber, and also define a pilot channel that communicates with the piston chamber. By supplying fluid through the pilot channel, the piston will be activated to move the valve member within the valve chamber to control the flow of fluid to an external operating mechanism, such as for example, a fluid cylinder.

As a feature of the invention, a novel sealing arrangement is provided for the moving components of the valve. In this regard, the inner surface of each body section is formed with a plurality of groove sections, each of which borders a compartment recess, and each groove section mates with and complements a groove section in the other body section to form annular grooves that receive seals. Each seal is formed of two sections, an annular rigid back-up ring formed of a thermoplastic material, such as nylon, and a resilient ring that is mechanically locked and bonded to the rigid back-up ring. The outer diameter of the resilient ring is provided with one or more circumferential ribs which are received within the grooves in the valve body, while the inner diameter of the resilient ring is generally rounded and is adapted to ride against the movable operating component, such as the valve or piston, to provide a seal therebetween.

By constructing the seals of a rigid annular back-up ring and a bonded annular resilient ring, the seals are self-aligned and concentricity is ensured when the two body sections or half shells are placed together. The rigid back-up ring preferably includes a circumferential tongue that is received within an annular groove in the resilient ring and the tongue acts as a barrier against forces that are incurred during the ultrasonic welding process of the two body sections. Further, the circumferential rib on the outer diameter of the resilient ring of the seal which is received within a groove in the valve body increases the sealing effect and allows molten plastic to flow around the ribs during the ultrasonic welding process.

As a further feature of the invention, the valve member is provided with an axial passage which extends the length of the valve member and serves to conduct fluid to the exhaust port of the valve body when the valve member is in one of its operating positions.

The two body sections which are connected to form the valve body are virtually mirror images of each other and the flow channels and recesses for internal components are formed partially, but not necessarily equally, in each body section.

To assemble the valve, the internal components are dropped into the recesses of one of the body sections and the second body section is then placed over the first section with the internal components seating within the recesses in the second body section. The two body sections are then joined together, preferably by ultrasonic welding, to provide the completed valve body.

The invention also includes a novel manual override mechanism through which the valve can be manually operated during set-up or in the event of power failure. In this regard, the axis of the valve member, as well as the axis of the piston, is at an angle to one of the sides of the valve body, and a manual override member is mounted for rotation in the valve body side. The inner end of the override member is provided with an inclined cam surface which engages the outer face of the piston. With this construction, manual rotation of the override member will provide a cam action to cause the inclined surface of the override member to move the piston and the connected valve member, thus providing a manual override for the valve.

Due to the half-shell construction, compactness is achieved by the piston and valve spool being placed in the valve body at an acute angle to the side edges of the body and the ability to construct curved aerodynamic flow passages.

The valve construction of the invention provides increased power density relative to size, because the flow channels, although narrow can be deep, curved and aerodynamically shaped, thus reducing turbulence by eliminating sharp corners and abrupt changes in the flow direction that normally impedes the movement of fluids in a conventional valve construction.

Other objects and advantages will appear in the course of the following description.

DESCRIPTION OF THE DRAWINGS

The drawings illustrate the best mode presently contemplated of carrying out the invention:

In the drawings:

FIG. 5A is a fragmentary enlarged section of the seal for the valve member;

FIG. 5B is a fragmentary enlarged section of the piston seal; and

FIG. 6 is an enlarged section taken along line 6—6 of FIG. 2.

DETAILED DESCRIPTION OF THE INVENTION

Figure 1:
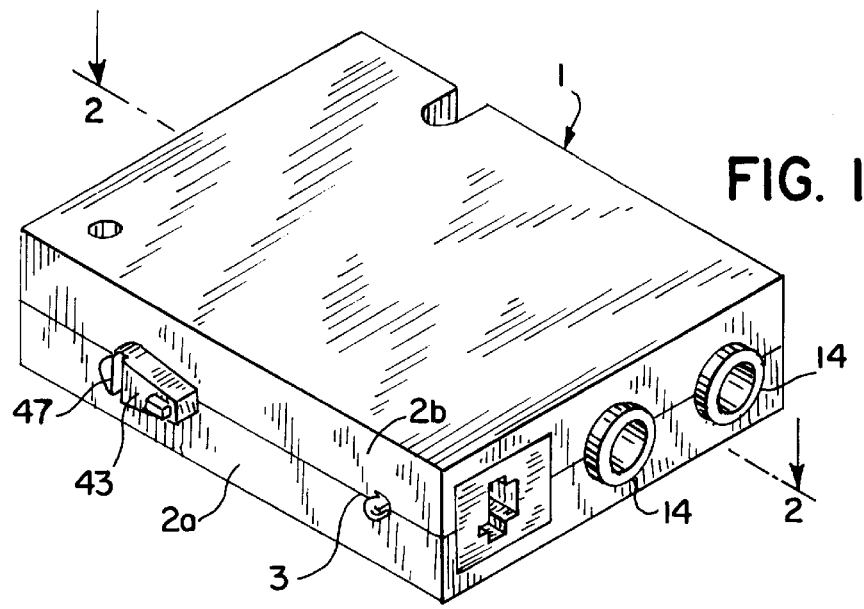
FIG. 1 is a perspective view of a valve constructed in accordance with the invention.

As shown in FIG. 1, the valve includes a body 1 formed of a pair of body sections 2a and 2b. Body sections 2a and 2b are preferably molded from a plastic material and each body section includes a generally flat inner surface 3. The surfaces 3 are in contiguous flat-wise relation along an interface, and are bonded together, preferably by ultrasonic welding, or by an adhesive or mechanical fasteners.

Figure 2:
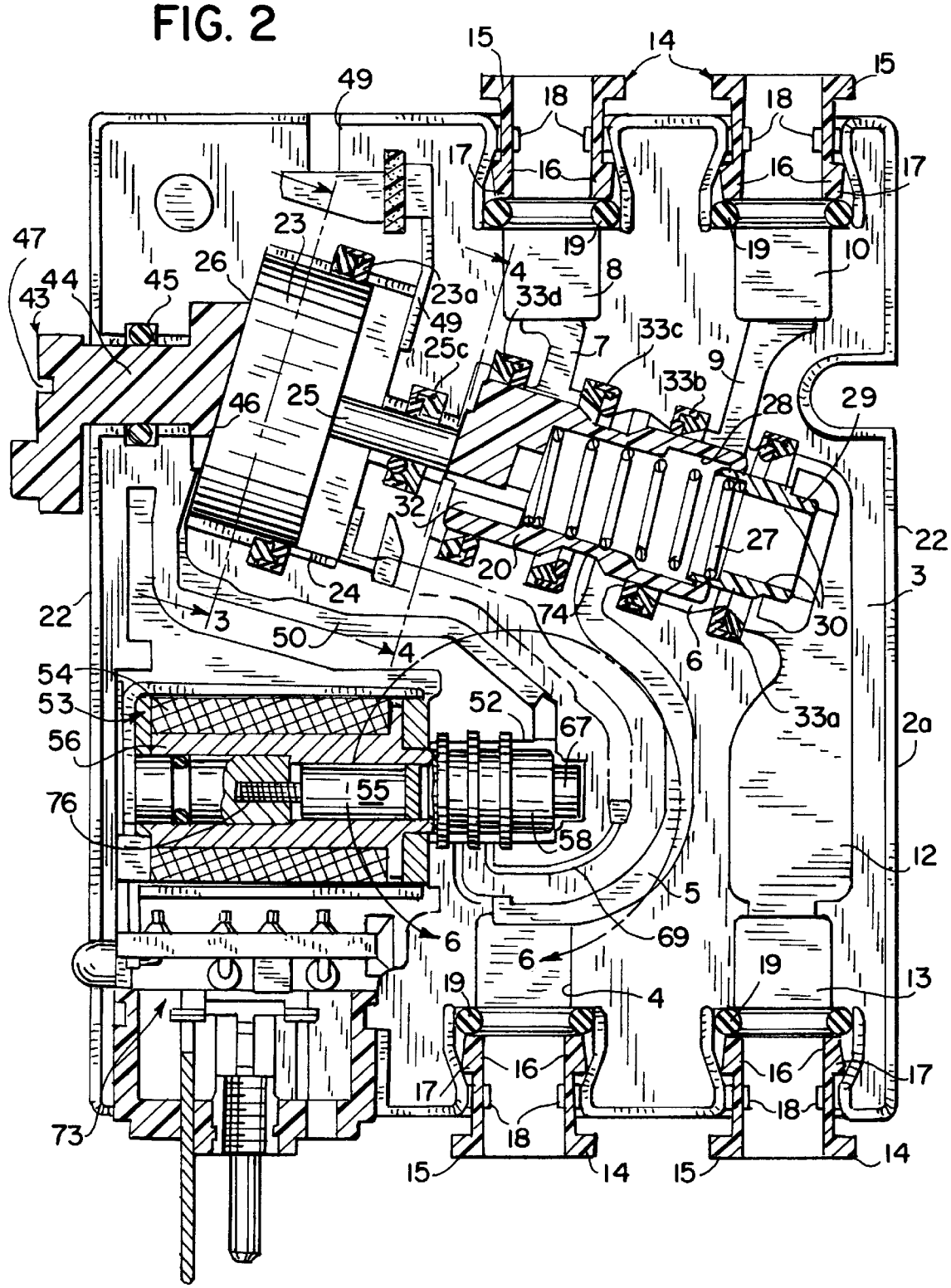
FIG. 2 is a section taken along line 2—2 of FIG. 1 and showing the inner surface of one of the body sections with the internal components placed therein.

FIG. 2 is a section taken along the interface between body sections 2a and 2b showing the inner surface 3 of body section 2a, with the internal components placed therein. Valve body 1 includes an inlet port 4 which is connected to a source of air or other fluid under pressure, and inlet port 4 communicates with a generally curved channel 5 which, in turn, is connected to a valve chamber or compartment 6. As shown in FIG. 2, a fluid channel 7 is connected to one end of valve chamber 6, and the outer end of channel 7 terminates in a port 8. In addition a flow channel 9 is connected to the opposite end of valve chamber 6 and channel 9 terminates in a port 10.

In addition, an end of valve chamber 6 is connected to a flow channel 12 which terminates in an exhaust port 13 located adjacent inlet port 4. The interface between body sections 2a and 2b intersects the ports 4, 8, 10 and 13, as well as the valve chamber 6 and piston chamber 24, and the flow channels 5, 7, 9 and 12. Thus, the flow channels and the chambers for the internal components are formed partially, but not necessary equally, in each body section 2a and 2b.

Ports 4, 8, 10 and 13 are similar in construction and each incorporates a push-in connector, such as that described in U.S. Pat. No. 5,222,715. More specifically, each push-in connector includes a collet or sleeve 14 which is inserted within each port and the outer end of the collet is provided with an outwardly extending flange 15 that is located on the exterior of the valve body. Collet 14 is formed with a plurality of equally spaced, flexible longitudinal legs 16 and each leg terminates in an enlarged head or tab 17 which is engaged with an annular shoulder formed in the body sections 2a and 2b of the valve body. The inner surface of each leg can be formed with one or more barbs or teeth 18 which are adapted to engage the outer surface of a flow tube, not shown, that is inserted within collet 14 and is sealed to the valve body 1 by a conventional O-ring seal 19 or other sealing mechanism.

Figure 3:
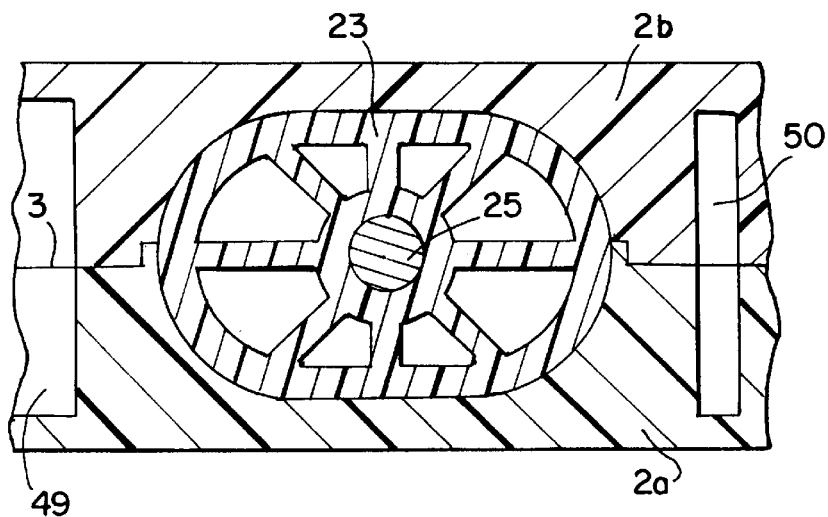
FIG. 3 is a section taken along line 3—3 of FIG. 2.
Figure 4:
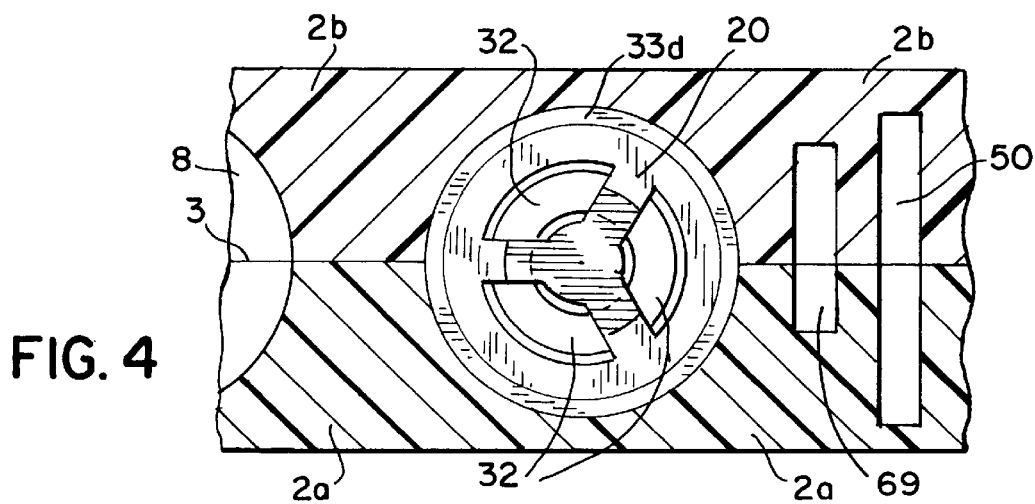
FIG. 4 is a section taken along line 4—4 of FIG. 2.

A valve member, such as a spool valve 20, is mounted for sliding movement within valve chamber 6 and, as shown in FIG. 2, the axis of spool 20 is at an acute angle to the opposed sides 22 of the valve body. Spool 20 is adapted to be moved within valve chamber 6 through operation of a piston 23 which is operably connected to the valve, and is located within a piston chamber 24. Spool 20 and valve chamber 6 are generally circular in cross-section, while piston 23 and piston chamber 24 are noncircular, preferably oval in cross section, as best seen in FIG. 3. The oval configuration of the piston enables the piston cross-sectional area to be increased for a given thickness of valve body, thus allowing lower pilot pressures to be used to move the piston 23 and spool 20.

Piston 23 carries a rod or stem 25 which is engaged with an end of spool 20, so that movement of the piston to the right, as seen in FIG. 2, will cause corresponding movement of spool 20. The upper or outer face of piston 23 is generally flat, as indicated by 26.

As illustrated, spool 20 and piston 23 are urged to the left, as seen in FIG. 2, by a coil spring 27 which is mounted within an axial passage 28 in spool 20. One end of the spring bears against an internal shoulder in spool 20, while the opposite end of the spring bears against an annular spring retainer 29 which is connected to the valve body 1. Retainer 29 is formed with an annular skirt 30 that is inserted in the open end of spool 20, and the skirt has a barb that engage an internal shoulder in the spool. With this construction, the force of the spring will urge spool 20 and piston 23 to the left, as shown in FIG. 2.

Spool 20 is mounted for sliding movement within valve chamber 6 and a series of annular seals 33a–d are employed to seal the spool to the valve body. Seals 33a–d are of identical construction and each seal, as best shown in FIG. 5A, includes a generally rigid back-up ring 34 and a resilient sealing ring 35. In practice, the back-up ring 34 can be composed of a plastic material, such as nylon, while the resilient ring 35 can be composed of nitrile rubber, or other similar material.

As best seen in FIG. 5A, back-up ring 34 is provided with an annular tongue or extension 36, which is received within a groove 37 in the resilient ring 35, thus providing a mechanical interlock between the rings. The outer portion 38 of resilient ring 35 located outwardly of tongue 36 is formed with one or more circumferential ribs 39 which are located within circumferential grooves 40 in the valve body 1. Each body section 2a is formed with a groove portion which mates and complements a groove portion in the other body section 2b, thereby forming a groove 40.

The inner diameter portion 42 of resilient ring 35 is generally rounded and is positioned to ride against the spool 20.

The two-piece construction of seals 33 provide a distinct advantage when the valve is composed of half sections 2a and 2b. During ultrasonic welding of the two sections, the plastic material will flow and the rigid back-up ring 34 provides a barrier which resists the flow of the molten plastic during the ultrasonic welding process and prevents the resilient ring from becoming displaced. The rigid back-up ring 34 also aids in aligning the seals in the half shells 2a and 3b, and assures concentricity of the seals.

Piston 23 and piston rod 25 can be sealed to valve body 1 by seals 23a and 25a, respectively, which are similar in construction to seals 33a–d. However, as shown in FIG. 5B, the rigid ring 34 of seal 23a can be larger in cross section than the back-up ring of seals 33a–d to provide greater stiffness.

As a feature of the invention, a manual override is provided through which the spool 20 can be operated manually during set-up or in the event of power failure. The override mechanism includes a rotatable override member 43 having a shaft 44 which is mounted for rotation within an opening in one of the sides 22 of the valve body. Each body section 2a and 2b can be formed with a generally semi-circular recess and when the body sections are joined, the two recesses will define an opening to receive the shaft 44 of the override member 43. Shaft 44 can be sealed to the valve body by an O-ring seal 45.

The axis of shaft 44 is located at an angle to the axis of piston 23, as shown in FIG. 2, and the inner end of shaft 44 is formed with a flat inclined cam surface 46 which is engaged with the outer face 26 of piston 23. The outer section 45 of the override member is provided with a slot 47 to receive a screwdriver, or other tool. By rotating the override member 43, the cam surface 46 will act through a wedging or cam action to move the piston 23 and spool 20, thus providing a manual override during set-up, or in the event of power failure.

As shown in FIG. 2, a vent passage 49 connects the lower end of the piston chamber 24 with the exterior and serves to vent air from the piston chamber as the piston 23 is moved downwardly. Vent passage 49 is defined by mating passage sections, each formed in the inner surfaces of the body sections 2a and 2b.

A generally curved pilot channel 50 connects the upper end of piston chamber 24 with a solenoid chamber 52. As previously described, the channel 50 is defined by mating channel sections formed in body sections 2a and 2b and similarly the solenoid chamber 52 is defined by chamber sections formed in the two body sections.

A conventional solenoid 53 is mounted in chamber 52 and includes an annular coil 54 and a movable plunger 55, which is separated from the coil by a generally cylindrical housing 56. A series of O-ring seals 57 seal the head 58 of housing 56 to the valve body 1. As best seen in FIG. 6, one end of a channel 59 is connected to channel 5, while the opposite end of the channel communicates with the radially extending end of an L-shaped passage 60 formed in head 58. When the solenoid is de-energized, the inner axial end of passage 60 is closed off by a resilient seat 63 that is carried by solenoid plunger 55. Energizing of the solenoid 53 will draw the plunger 55 and seat 63 inwardly to open the passage 60, as shown in FIG. 6.

As best shown in FIG. 6, a pair of axial passages 64 extends through head 58 and provide communication between plunger chamber 65 and an outer chamber 66. The outer end of head 58 is provided with a plurality of spaced longitudinal fingers 58a and a spring retainer 67 is connected to the fingers and closes off chamber 66. Chamber 66 communicates via the spaces between the fingers 58a with channel 50 and the upper portion of piston chamber 24.

Head 58 is also formed with an L-shaped passage 68. One end of passage 68 communicates with chamber 66 while the opposite end communicates with a curved flow channel 69 formed in the valve body 1. Channel 69 is connected to the lower portion of piston chamber 24 beneath piston 23 and to vent passage 49.

A resilient seat or poppet 70 is located in chamber 66 and a spring 71 is interposed between the seat and spring retainer 67 and urges the seat to the left, as shown in FIG. 6, to close off passage 68.

In addition, a pair of pins 72 extend through openings in head 58 and are located 90° from passages 64. One end of each pin bears against seat 63 while the opposite end engages the seat 70.

An electrical control unit 73 for solenoid 53 is mounted within a chamber in the valve body and serves to connect the solenoid to a source of electrical power.

To assemble the valve of the invention, one of the body sections, such as 2a, is placed with the surface 3 facing upwardly and the various internal components, such as spool 20, piston 23, solenoid 53 and the various seals, are then dropped into the open-sided recesses, channels and grooves in the body section. The second body section 2b is then placed on the top of the first body section containing the internal components and the two body sections are sealed together along the interface, preferably by ultrasonic welding, or by chemical bonding, or mechanical means. With the invention, the internal components are automatically trapped in place and all of the channels and chambers are formed and sealed. Thus, no additional machining or auxiliary components are required.

FIG. 2 shows the valve with the solenoid in the deenergized state. In this condition, air is supplied to the valve through port 4 and passes through channel 5 to the valve chamber 6. Spool 20 has a circumferential recess or groove 74 that is located generally centrally of the length of the spool, and in this position of the spool the seal 33c will be spaced from the spool to provide an annular gap or passage. The air flows through this gap or passage into the annular space between the seals 33c and 33d and then flows through channel 7 and port 8 to the operating element, such as a fluid cylinder.

Air being returned from the cylinder will flow into port 10 and through channel 9 and then pass through the annular gap between seal 33a and spool 20 to channel 12 and then through the exhaust port 13. In this condition, with the solenoid not being energized, the plunger seat 63 will be in a closed position, so that there will be no flow of air into the pilot channel 50.

Energizing the solenoid will draw plunger 55 inwardly, thus moving the seat 63 away from the passage 60, so that air will then flow from channel 5 through channel 59 and passage 60 to the plunger chamber 65. The air will then pass through the axial passages 64 to the chamber 66 and then through the spaces between fingers 58a to pilot channel 50 and hence to the upper portion of piston chamber 24, thus exerting a force on the face 26 of the piston to move the piston 23 and spool 20 to the right as viewed in FIG. 2. A small portion of the air may also flow from chamber 66 through an opening 75 in cap 67 to channel 50 The air beneath the piston in piston chamber 24 will be vented through the vent passage 49. At this time seat 70 will be urged to the left as seen in FIG. 6 by spring 71 closing off passage 68.

Movement of the spool 20 will bring the groove 74 in alignment with seal 33b, and also cause the peripheral surface of the spool to engage the seal 33c. The air in channel 5 will then flow through the gap between seal 33b and the spool, then through channel 9 and port 10 to the operating element, such as a fluid cylinder. Air being returned from the operating element will pass through the port 8 and into channel 7 and then into the upper end of the valve chamber 6. The air will then pass through the axial holes 32 into the central passage 28 of spool 20 and will then be exhausted through channel 12 and port 13.

When the solenoid 53 is deenergized, plunger 55 and seat 63 will be moved outwardly under the influence of the solenoid spring 76 to close off the passage 60, so that no air will be supplied to the pilot channel 50. Movement of plunger 55 will act through pins 72 to move seat 70 against the force of spring 71 to open passage 68. The piston 23 and spool 20 move to the position shown in FIG. 2 under the influence of spring 27, and the air in the upper portion of the piston chamber 24 will flow through pilot channel 50 and into chamber 66, and then through passage 68 to channel 69. The air will then pass through channel 69 to the lower portion of piston chamber 24 beneath the piston and will be discharged to the exterior through the vent passage 49.

The drawings show the invention as applied to a single solenoid, piloted, pneumatic valve, but the invention is not limited to this particular valve construction and can be used with a wide variety of valves.

While the drawings show the spool 20 and piston 23 being returned to the upper position under the influence of spring 27, it is contemplated that a double-acting piston can be directly fixed to the valve, so that the valve will be moved in both directions through operation of the piston.

Further, the drawings show the outer surfaces of the body sections 2a and 2b to be flat, but it is contemplated that these surfaces can be recessed in certain areas to reduce weight and material without changing the overall function of the valve.

The valve of the invention has substantially improved power density, compactness and cost effectiveness, as compared to conventional valves. While compact in size, the valve has substantially improved power density because the flow channels, although narrow, can be designed with considerable depth and can be curved or aerodynamically shaped, thus reducing turbulence and abrupt changes in flow direction.

Because of the half-shell construction, in which no machining is required, the piston and spool can be located at an acute angle to the side edges of the valve body and the flow channels can be curved and aerodynamically shaped, thus resulting in improved compactness for the valve.

I claim:

1. A valve construction, comprising a body including plurality of body sections each having an inner surface, said inner surfaces being disposed in contiguous relation along an interface, each inner surface having a plurality of recesses that mate and complement recesses in the surface of the other body section to form a first chamber of non-circular cross section and a connected second chamber, a piston disposed for sliding movement in said first chamber and having a non-circular cross-section to complement the non-circular cross section of the first chamber, said piston having a major diameter and a minor diameter, said major diameter disposed parallel to said interface, a valve member disposed for movement in said second chamber and operably connected to said piston, each inner surface having a group of first channel portions each mating with and complementing a group of first channel portions in the inner surface of the other body section to form flow channels communicating with second chamber, means for supplying a fluid to said flow channels, means for moving said piston to operate said valve member and control flow of fluid in said flow channels, and connecting means for connecting the inner surfaces of the body sections together along said interface.

2. The valve construction of claim 1, wherein said piston is generally oval in cross-section.

3. The valve construction of claim 2, and including a rod connected to said piston and operably engaged with said valve member.

4. The valve construction of claim 2, wherein each inner surface has a second channel portion mating and complementing a second channel portion in the other body section to form a pilot channel communicating with said first chamber, said means for moving said piston comprising means for supplying fluid to said pilot channel.

5. The valve construction of claim 1, wherein said valve member is slidable within said second chamber and said valve construction includes a seal fixed to said valve body and disposed to engage said valve member, the inner surface of each body section having a grooved section mating with and complementing a grooved section in the inner surface of the other body section to provide an annular groove bordering said second chamber, said seal comprising a rigid back-up ring and a resilient ring connected to said back-up ring and disposed to engage said valve member, and an annular rib disposed on the outer periphery of said resilient ring and received within said groove, said connecting means comprising an ultra-sonic weld connecting the inner surfaces of the body section together.

6. The valve construction of claim 5, and including a circumferential projection formed on said rigid ring and received within an annular recess in said resilient ring.

7. A valve construction, comprising a body including a plurality of body sections each having an inner surface, said inner surfaces being disposed in contiguous relation along an interface, each inner surface having a plurality of recesses that mate and complement recesses in the surface of the other body section to form a first chamber and a connected second chamber, a piston having a generally oval cross section disposed in said first chamber, said piston having a major diameter disposed parallel to said interface and having a minor diameter disposed normal to said interface, said first chamber having a generally oval cross-section to complement the cross-section of said piston, a valve member disposed for sliding movement in said second chamber and operably connected to said piston, the inner surface of each of said body sections also having a plurality of channel portions which mate and complement channel portions in the inner surface of the other body section to form flow channels for the flow of fluid to said first and second chambers, the inner surface of each body section having a groove section bordering the second chamber and mating and complementing a groove section in the inner surface of the other body section to form a groove bordering said second chamber, and an annular seal comprising a rigid back-up ring and a resilient ring secured to said back-up ring, a circumferential rib on the outer surface of said resilient ring and disposed in said groove, said resilient ring having an inner surface disposed to engage said valve member, and ultra-sonic weld means connecting the inner surfaces of said body sections together.

8. A valve construction, comprising a body including a pair of body sections each having an inner surface, said inner surfaces being disposed in contiguous relation along an interface, said body having an exterior wall intersected by said interface, each inner surface having a plurality of recesses that mate and complement recesses in the inner surface of the other body section to form a first chamber and a connected second chamber, a rigid piston disposed for movement in said first chamber with the axis of said piston being disposed at an acute angle to said exterior wall, a valve member disposed for movement in said second chamber and operably connected to said piston, said piston having a flat outer face disposed normal to said axis and disposed at an acute angle to said exterior wall, connecting means for connecting the inner surfaces of said body sections together, a manual override member extending through said exterior wall and disposed along the interface between said inner surfaces and projecting into said first chamber, said override member having a cam surface disposed to contact the outer face of said piston, and means for moving said override member to cause movement of said piston in said first chamber and corresponding movement of said valve member in said second chamber.

* * * * *